Oct. 17, 1944.     C. A. ANDERSON     2,360,385
DRILL
Filed March 8, 1941     2 Sheets-Sheet 1
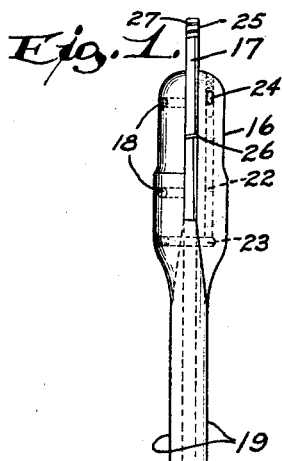
Fig. 1.
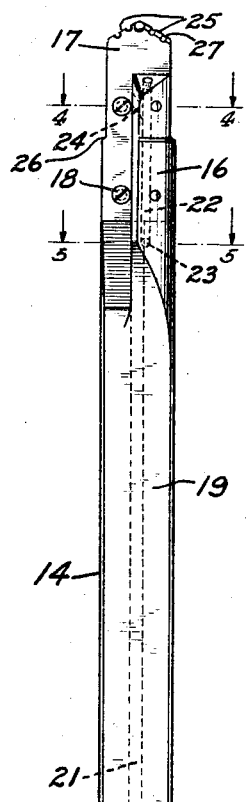
Fig. 2.
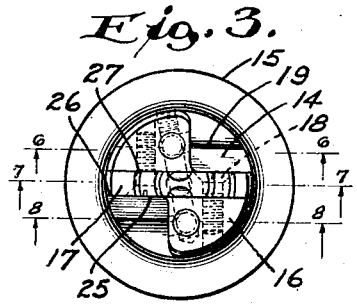
Fig. 3.
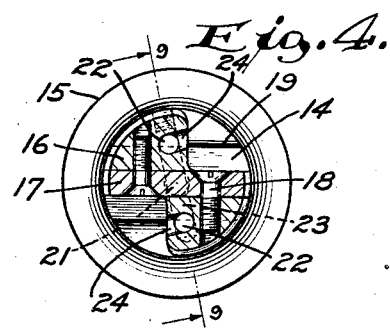
Fig. 4.
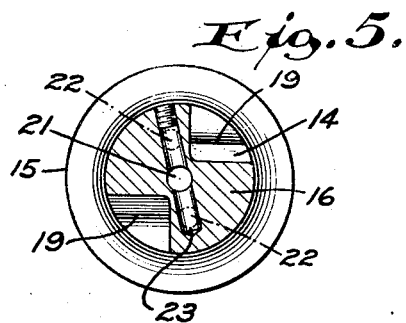
Fig. 5.
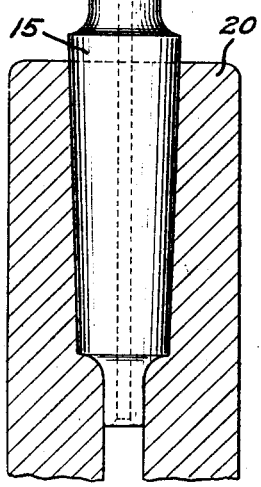
INVENTOR.
C. A. Anderson
BY Lieber & Lieber
ATTORNEYS.

Oct. 17, 1944.  C. A. ANDERSON  2,360,385
DRILL
Filed March 8, 1941  2 Sheets-Sheet 2

INVENTOR.
C. A. Anderson
BY Lieber & Lieber
ATTORNEYS.

Patented Oct. 17, 1944

2,360,385

UNITED STATES PATENT OFFICE 2,360,385

DRILL

Conrad A. Anderson, Milwaukee, Wis., assignor to Blackhawk Mfg. Co., Milwaukee, Wis., a corporation of Wisconsin Application March 8, 1941, Serial No. 382,401

5 Claims. (Cl. 77—68)

This invention relates generally to improvements in the art of boring holes in diverse objects, and relates more specifically to various improvements in the construction and operation of drills especially adapted to form circular holes in metallic bodies or the like.

It has heretofore been common commercial practice when drilling holes of relatively large diameter in rather small and portable metal objects or bodies, to utilize a stationarily mounted inverted twist drill and to rotate the objects about the central axis of the drill while suspended thereabove. One reason for this practice of inverted drilling, is to facilitate downward escape of the chips by gravity away from the zone of cutting, and this removal of the chip debris may be enhanced by forcing cooling and flushing liquid through one or more elongated passages in the drill, and against the work adjacent to the cutting edges. This cooling liquid will thereafter flow downwardly along the helical grooves of the twist drill and carry the chips with it. In order to provide these elongated liquid circulating passages extending throughout the length of the twist drill, it was necessary to form the circulating holes in the drill body before final twisting thereof, and this procedure would frequently cause the liquid ducts to offset and become distorted to such an extent that either free circulation was impossible, or the drill was weakened and would break. This was especially true in long twist drills, and another objection to these prior structures was the improper location of the discharge orifices of the cooling liquid passages, which were usually disposed between the heels of the cutting portions of the drill and the work, and thus prevented free escape of the liquid and precluded proper flushing of chips away from the cutting edges. It was moreover difficult with these twist drills, to produce drilled holes having several adjoining sections of different diameter, and the regrinding of the twist drills for such purposes also introduced serious problems due to grinding difficulty and waste of stock. The prior liquid cooled twist drills were expensive to construct and to maintain, requiring considerable attention to keep them in proper operating condition, and could not be varied in diameter to meet slightly different conditions of use.

It is therefore an object of my invention to provide an improved drill especially adapted for inverted operation, which is simple and durable in construction and highly flexible and efficient in use.

Another object of the present invention is to provide a new and useful drill assemblage so formed and having liquid circulating passages provided with discharge orifices so directed, that chip debris will be most effectively broken up and removed from the cutting zone by liquid flushing action.

A further object of this invention is to provide an improved drill structure having a readily renewable cutting portion capable of effectively producing single or multiple diameter holes, and which can be conveniently resharpened and maintained in operative condition with minimum attention and waste of tool stock.

Still another object of the invention is to provide a new drill construction having liquid circulating passages and ducts therein which can be readily formed, and in which the cooling and fluishing liquid can escape freely from the cutting zone or zones.

An additional object of my invention is to provide an exceptionally strong and accurately formed drill assembly which will withstand severe usage, which can be manufactured at moderate cost, and which is especially adapted for use while fixedly held in an inverted position and cooperating with revolving work suspended thereabove, but which can also be positively rotated and caused to cooperate with stationary work.

These and other objects and advantages of the present improvement, will be apparent from the following detailed disclosure.

A clear conception of the several features constituting my invention, and of the mode of constructing and of utilizing drills built in accordance with the improvement, may be had by referring to the accompanying drawings in which like reference characters designate the same or similar parts in the various views.

Fig. 1 is a side elevation of one of the improved drills fixedly mounted in inverted position ready for use, looking edgewise toward the renewable cutting blade;

Fig. 2 is a similar elevation of the drill assemblage, the view being taken at right angles to that of Fig. 1;

Fig. 3 is a top view of the drill showing the cutting blade in active position, and drawn to an enlarged scale;

Fig. 4 is a similarly enlarged transverse section through the drill structure, taken along the line 4—4 of Fig. 2;

Fig. 5 is another likewise enlarged transverse section through the drill, taken along the line 5—5 of Fig. 2;

Figure 6:
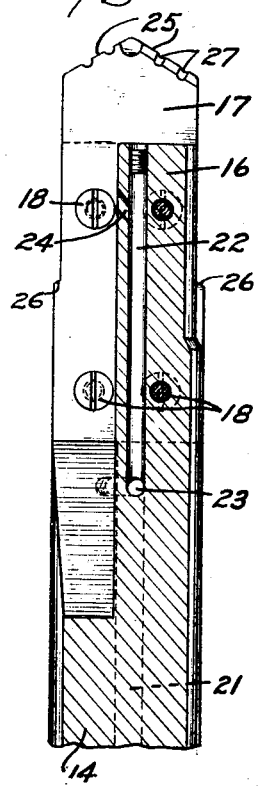
Fig. 6 is an enlarged vertical or longitudinal section through the cutter supporting head of the drill, taken along the line 6—6 of Fig. 3.
Figure 7:
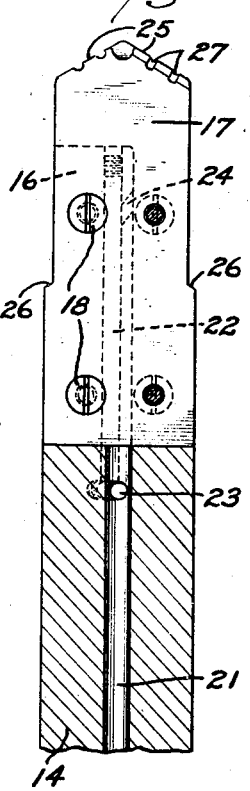
Fig. 7 is another enlarged vertical section through the upper portion of the drill assemblage, taken along the line 7—7 of Fig. 3 but showing the cutting blade in elevation.
Figure 8:
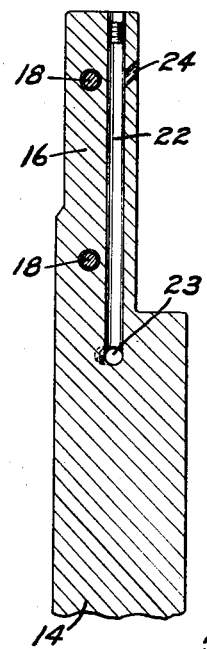
Fig. 8 is still another enlarged longitudinal section through the cutter supporting head, taken along the line 8—8 of Fig. 3.

Although my invention has been shown herein by way of illustration, as having been applied to double and single diameter cutting, liquid cooled, inverted drill assemblages especially adapted for metal cutting, it is not the desire or intention to thereby unnecessarily restrict the scope or utility of the improvement.

Referring specifically to Figs. 1 to 11 inclusive, the improved two diameter cutting drill assemblage shown therein comprises in general, an elongated body 14 having an integral tapered supporting shank 15 at one end and an integral bifurcated blade or cutter supporting head 16 at its opposite end; and a renewable cutting blade 17 adapted to be inserted within the bifurcation of and firmly detachably secured to the head 16 by means of machine screws 18.

The elongated body 14 has reduced transverse cross-section by virtue of the provision of flattened areas 19 on the opposite sides thereof extending from the head 16 to a point near the supporting shank 15; and the tapered shank 15 is adapted to be detachably associated with a fixed mounting 20 of any suitable type, so as to hold the drill in inverted upright position. The bifurcated head 16 consists of two approximate cylinder quadrants having the blade receiving bifurcation therebetween, and the upper portion of the head 16 is of lesser diameter than the lower portion thereof.

Figure 9:
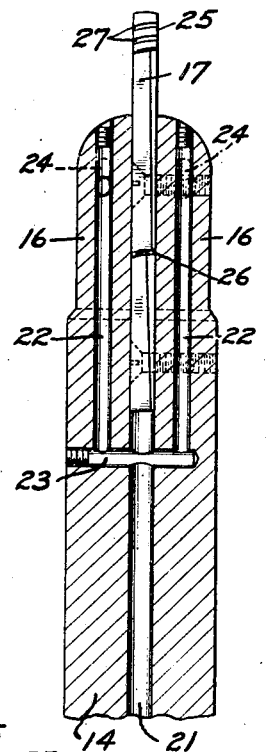
Fig. 9 is an enlarged longitudinal section through the upper portion of the drill structure, taken along the line 9—9 of Fig. 4.
Figure 10:
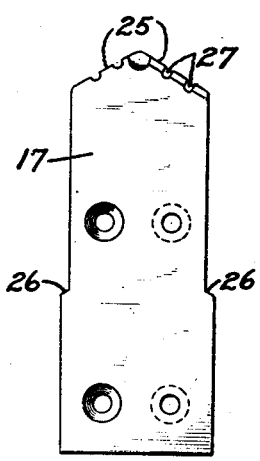
Fig. 10 is a likewise enlarged plan view of one of the double diameter cutting drill blades.
Figure 11:
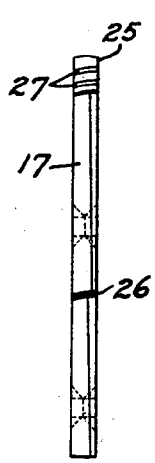
Fig. 11 is a similarly enlarged edge view of the blade of Fig. 10.

The body 14 and shank 15 of the drill are pierced by an elongated central liquid conducting passage 21 to the lower end of which cooling liquid under pressure may be admitted from any suitable source, and the upper end of this passage terminates at the bottom of the bifurcation in the head 16 and is normally closed by the blade 17. Each of the quadrant sections of the head 16 is provided with an internal duct 22, the upper extremities of which are plugged as shown in Fig. 9, and the lower ends of which communicate through a transverse drilled hole 23 with the central passage 21; and each of the ducts 22 has an upwardly and outwardly tangentially directed discharge port 24, see Figs. 6 and 8. These liquid delivery ports 24 are preferably so located and positioned that they will direct the liquid delivered therefrom at rather high velocity, toward the relatively advancing or front sides of the blade 17 near the cutting edges; and the end of the drilled hole 23 is plugged as indicated in Fig. 9, so as to prevent escape of liquid other than through the ports 24.

The double cutting blade 17 which is normally rigidly but detachably secured to the two sections of the bifurcated head 16 by means of the screws 18, is preferably formed of tool steel and has two outwardly directed inner cutting edges 25 at the extreme end thereof, and two outwardly directed outer cutting edges 26 at its medial portion. The inner cutting edges 25 which are of considerable length, may be provided with staggered chip breaking notches 27 as clearly shown in Figs. 10 and 11; and this particular type of drill blade 17 is adapted to form drill holes having two diameters corresponding respectively to the diametral distances across the inner blade edges 25 and the outer blade edges 26. It is to be noted that the blade 17 may be re-ground for a considerable distance without interfering with the head 16.

Figure 12:
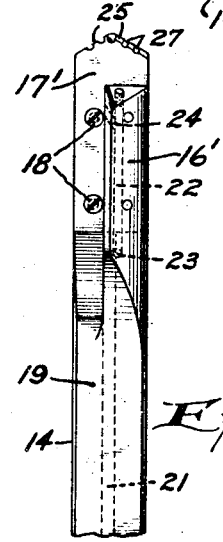
Fig. 12 is a view similar to Fig. 2, but showing the improvement applied to a blade assemblage for drilling holes of but a single diameter.

The improved single diameter cutting drill illustrated in Fig. 12, may be similar in most details to that shown in Figs. 1 to 11 inclusive, and differs therefrom primarily in that the bifurcated head 16' has uniform diameter, and the drill blade 17' is of uniform transverse width or diameter throughout its length. The use and operation of the two types of drills is identical, except that one of the assemblages is adapted to form two diameter drilled holes while the other is only adapted to produce single diameter holes.

During normal use of the improved drill assemblages, the drill body may either be fixedly mounted and applied to revolving objects or work, or it may be rotated about its own axis and applied to stationary work. As shown in the drawings, the drill is inverted and fixedly mounted in a stationary mounting 20, and suitable cooling and lubricating liquid is normally being circulated in abundant quantities from a supply source through the central passage 21, transverse hole 23, ducts 22, and orifices 24. As this liquid is delivered at rather high velocity from the orifices 24 located between and in front of the cutting edges 25, 26, it not only prevents overheating of the blade 17, but also produces a thorough washing and flushing action whereby chip debris is quickly removed from the zone of cutting and is carried downwardly along the flattened body portions 19 by the liquid which flows by gravity therealong and out of the hole being drilled. The chips produced by the longer cutting edges 25 as they advance into the body of the work, are effectively broken up by the staggered breaker notches 27, and are thus prevented from lodging in the spaces of the head 16, and this head is also formed to effectively steady the drill near the zones of cutting. When a double cutter 17 is being utilized, the cutting edges 25 will produce a drilled hole of one diameter whereas the cutting edges 26 will simultaneously produce a hole portion of somewhat larger diameter contiguous with the smaller hole. However, when a single cutting blade 17' is employed, the finished hole will have but one diameter. The successive drilled holes may thus be quickly and effectively produced, and the chips are rapidly removed during the drilling operations.

From the foregoing detailed description it will be apparent that the present invention provides an improved drill assemblage especially adapted for inverted high speed operation, which is simple and durable in construction and highly efficient in use. The flattened section of the drill body 14 is exceedingly strong and resistant to torsion stresses, and also makes it possible to readily form the rectilinear central liquid conducting passage 21. The formation of the bifurcated head 16 also makes it possible to readily and effectively apply the ducts 22 and orifices 24, and the connecting hole 23 may be readily formed by drilling through a thickened and relatively strong section of the drill assemblage. By utilizing removable and renewable cutting blades, the drill body may be used indefinitely with minimum waste of valuable machine tool stock, since it is only necessary to replace the relatively small blades 17 after they have been repeatedly re-ground to such an extent that they can no longer be used. The attaching screws 18 make it possible to quickly and conveniently apply and remove the cutting blades, and cooperate with the bifurcated head to firmly hold the cutters in position. The improved double cutting blades 17 also facilitate regrinding of this particular type of drill, and greatly reduce the cost thereof. The specific formation of the drill head 16 and body 14, and the location and disposition of the liquid delivery ports 24, insures rapid removal of chip debris and thus makes clean and effective cutting possible, and the entire drill assembly may obviously be manufactured at moderate cost and operated with minimum attention. The improved drills have proven highly satisfactory and successful in actual commercial use, as applied to both single and double diameter drilling, and have also proven superior in action to the old style twist drills especially for inverted operation. The term "advancing" as used herein in connection with the blade or cutting edge, is intended to cover relative advancement of the cutter and work, and is not to be confined either to an assemblage wherein the drill is fixed, or rotated.

It should be understood that it is not desired to limit this invention to the exact details of construction or to the precise mode of use, herein shown and described, for various modifications within the scope of the appended claims may occur to persons skilled in the art.

I claim:

1. A drill comprising, a shank formed for fixed mounting in a lower support and having an integral elongated upstanding body formed with parallel plane surfaces on its opposite sides and provided at its upper end with an integral enlarged bifurcated cutter supporting head the bifurcation of which lies in a plane parallel to said surfaces, and a blade coacting with the bifurcation of said head and having an outwardly directed cutting edge, said head having a liquid discharge orifice directed toward and in advance of said cutting edge.

2. A drill comprising, a tapered shank, an elongated body having uniform transverse cross sectional area throughout its length and being formed integral with said shank and having parallel plane opposite side surfaces disposed equidistant from the shank axis, an enlarged bifurcated cutter supporting head formed integral with said body and having a bifurcation crossing said axis and disposed midway between and parallel to the planes of said side surfaces, and a flat cutter blade detachably secured to said head within said bifurcation and having both end and side cutting edges, said head having a liquid discharge orifice directed toward and in advance of said cutting edges.

3. A drill comprising, a tapered shank, an elongated body having uniform transverse cross sectional area throughout its length and being formed integral with said shank and having parallel plane opposite side surfaces disposed equidistant from the shank axis, an enlarged bifurcated cutter supporting head formed integral with said body and having a bifurcation crossing said axis and disposed midway between and parallel to the planes of said side surfaces, and a flat cutter blade detachably secured to said head within said bifurcation and having end and side cutting edges, said shank and body having a central rectilinear liquid conducting passage therein terminating at the bottom of said bifurcation and said head having liquid discharge orifices communicating with said passage and directed toward said end cutting edges of said blade.

4. A drill comprising, a supporting shank having an elongated body formed integral therewith, said body having parallel plane surfaces on its opposite sides and being provided at its end remote from said shank with an integral enlarged cutter supporting head having a transverse bifurcation lying between and parallel to said surfaces, portions of said head on opposite sides of the bifurcation thereof being removed to provide elongated diametrically opposite spaces extending along the head from one end to the other thereof, and a blade coacting with said bifurcation and having cutting edges extending along and directly exposed to said spaces.

5. A drill comprising, a supporting shank having an elongated body formed integral therewith, said body having parallel plane surfaces on its opposite sides and being provided at its end remote from said shank with an integral enlarged cutter supporting head having a transverse bifurcation lying between and parallel to said surfaces, portions of said head on opposite sides of the bifurcation thereof being removed to provide elongated diametrically opposite spaces extending along the head from one end to the other thereof, and a blade coacting with said bifurcation and having cutting edges extending along and directly exposed to said spaces, said head having liquid discharge orifices directed into said spaces toward and in alvance of said cutting edges.

CONRAD A. ANDERSON.